Figure 1:
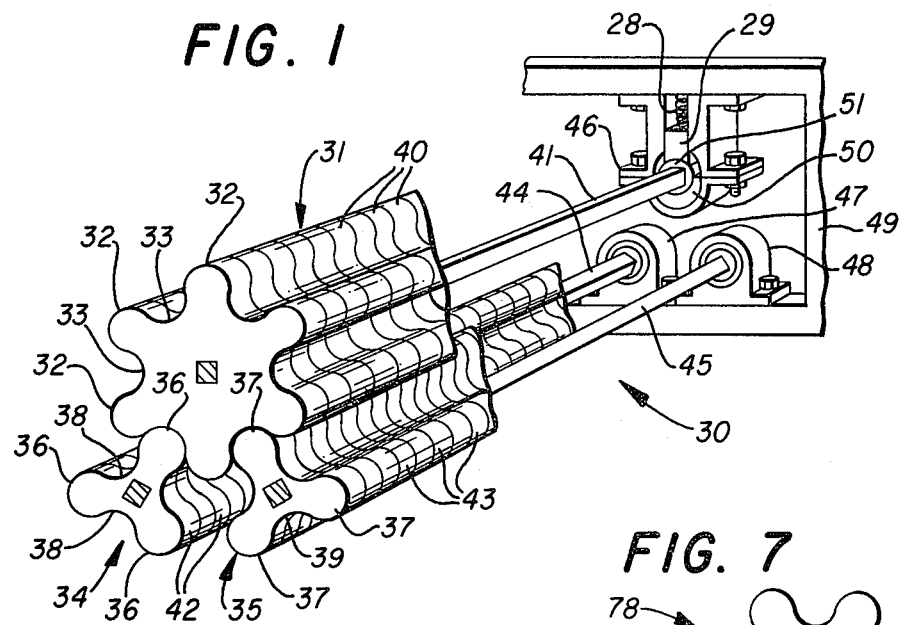
Figure 7:
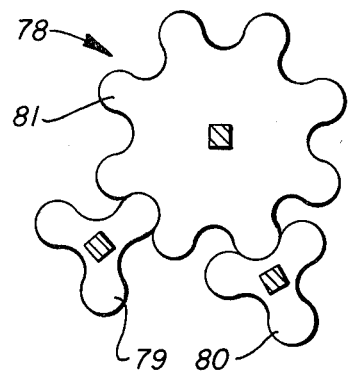

United States Patent [19]

Smith

[11] 4,446,678
[45] May 8, 1984

[54] MATERIAL PROCESSING MACHINERY

[76] Inventor: Teddy V. Smith, 1421 Earlshire, Plano, Tex. 75075

[21] Appl. No.: 408,516

[22] Filed: Aug. 16, 1982

Related U.S. Application Data

[63] Continuation of Ser. No. 190,481, Sep. 24, 1980, abandoned.

[51] Int. Cl.³ ...................... A01D 82/00; A01D 43/10
[52] U.S. Cl. .................................. 56/1; 56/DIG. 1; 56/DIG. 2
[58] Field of Search ................. 56/1, DIG. 1, 328 R, 56/DIG. 2; 100/118, 121

[56] References Cited

U.S. PATENT DOCUMENTS

| | | | |
|---|---|---|---|
| 23,238 | 3/1859 | Emerson, Jr. | 100/121 |
| 26,037 | 11/1859 | Hoffman | 100/118 |
| 1,121,747 | 12/1914 | Messcharrt | 100/121 |
| 2,270,007 | 1/1942 | McKinnis | 100/121 |
| 2,333,153 | 11/1943 | Crow | 56/1 |
| 2,896,267 | 7/1959 | Nord | 100/121 |
| 2,921,426 | 1/1960 | Heth | 56/DIG. 1 |
| 3,105,338 | 10/1963 | Cunningham | 56/DIG. 1 |
| 3,111,742 | 11/1963 | Lakin | 56/DIG. 1 |
| 3,241,216 | 3/1966 | Wellendorf | 56/DIG. 1 |
| 3,479,805 | 11/1969 | Soteropulos | 56/DIG. 1 |
| 3,630,011 | 12/1971 | Dunn | 56/328 R |
| 4,109,448 | 8/1978 | Kline | 56/1 |
| 4,258,537 | 3/1981 | Christman | 56/DIG. 1 |
| 4,265,076 | 8/1981 | Krutz | 56/DIG. 1 |

*Primary Examiner*—Paul J. Hirsch
*Attorney, Agent, or Firm*—Warren H. Kintzinger

[57] ABSTRACT

A rotative plant material squeezing and shear force cell rupturing machine having a plurality of rollers, each with lobes and grooves intermeshing with the lobes and grooves of other rollers; the lobes and grooves may be either radial or axial irregularities of the rollers. By adjustment of roller spacing material processing may be varied from slight squeezing and shear fracture of the cells to almost total pulverization of the plant material.

5 Claims, 21 Drawing Figures

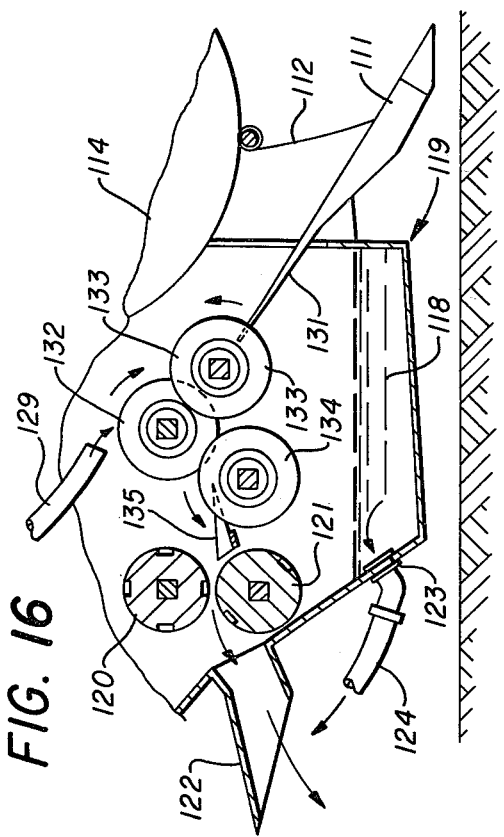
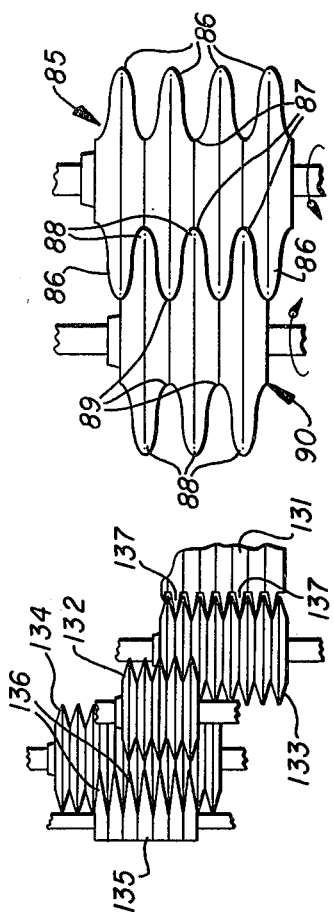
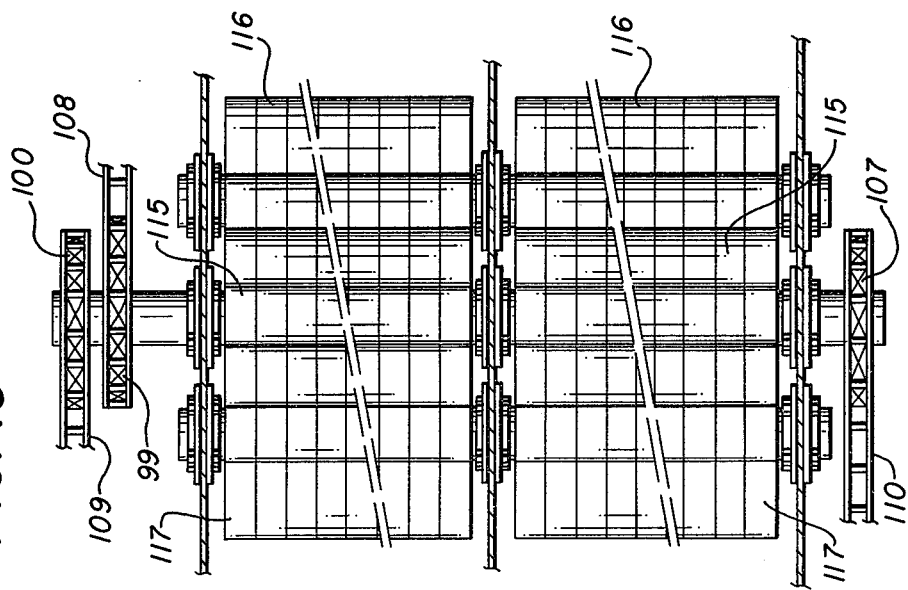

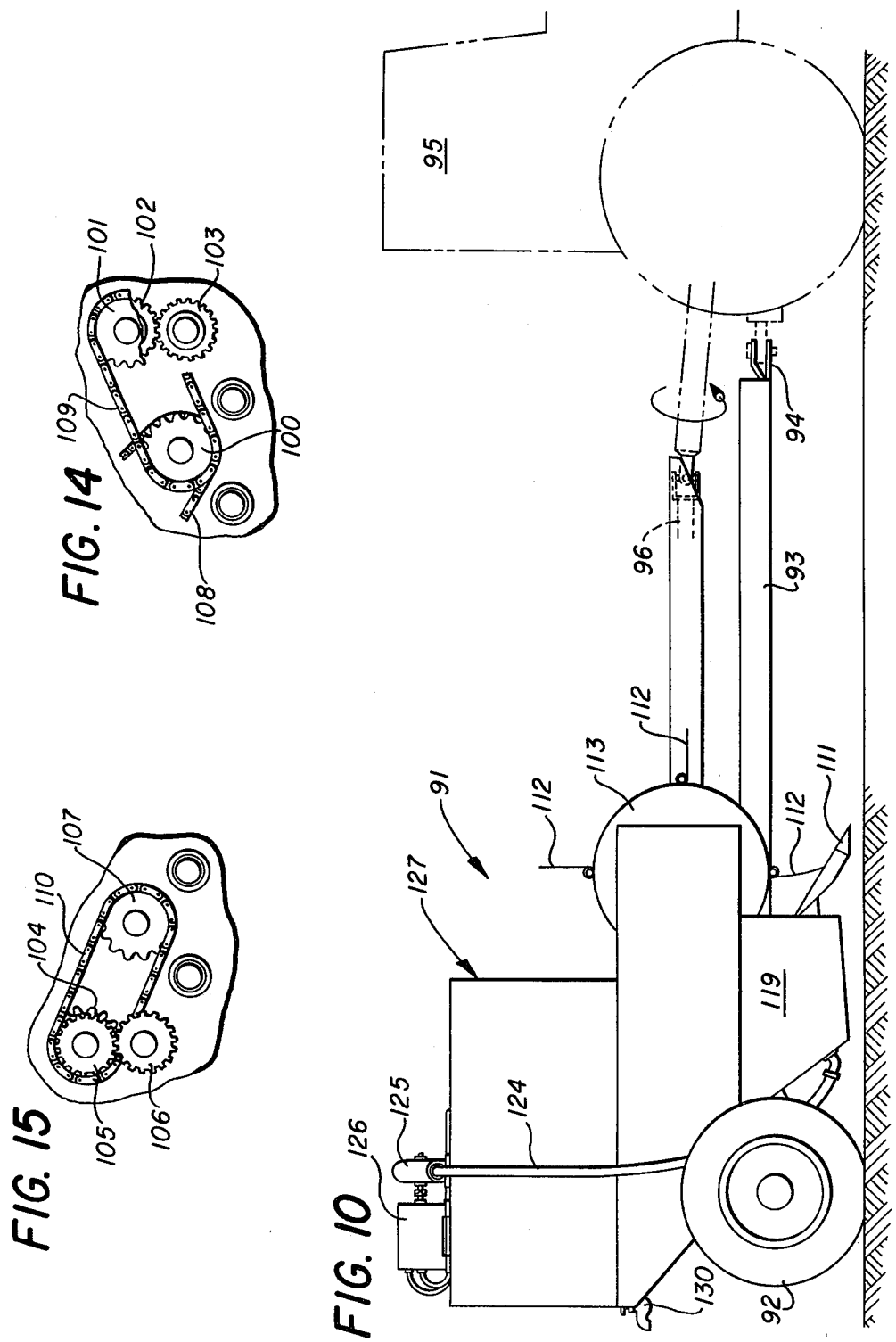

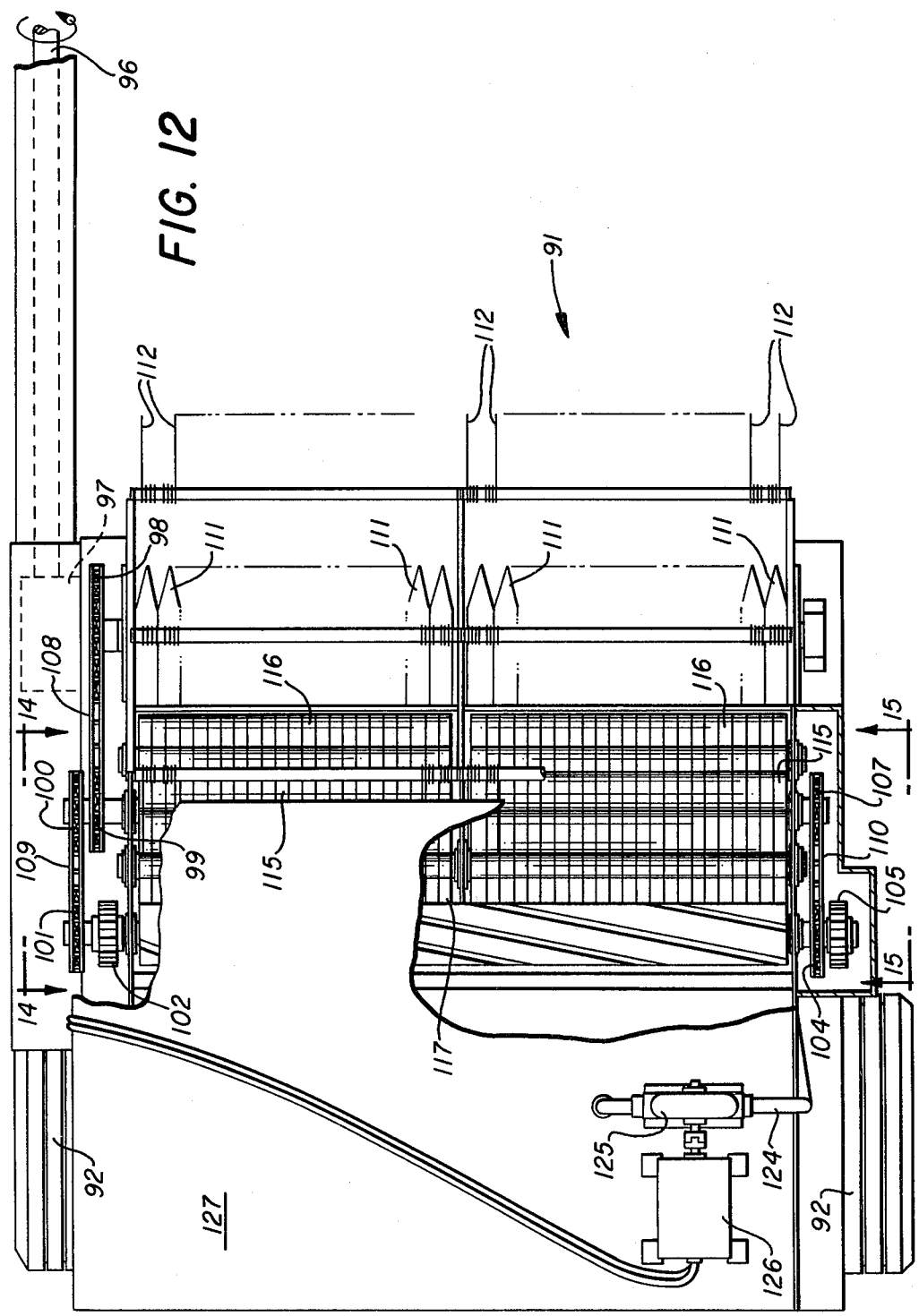

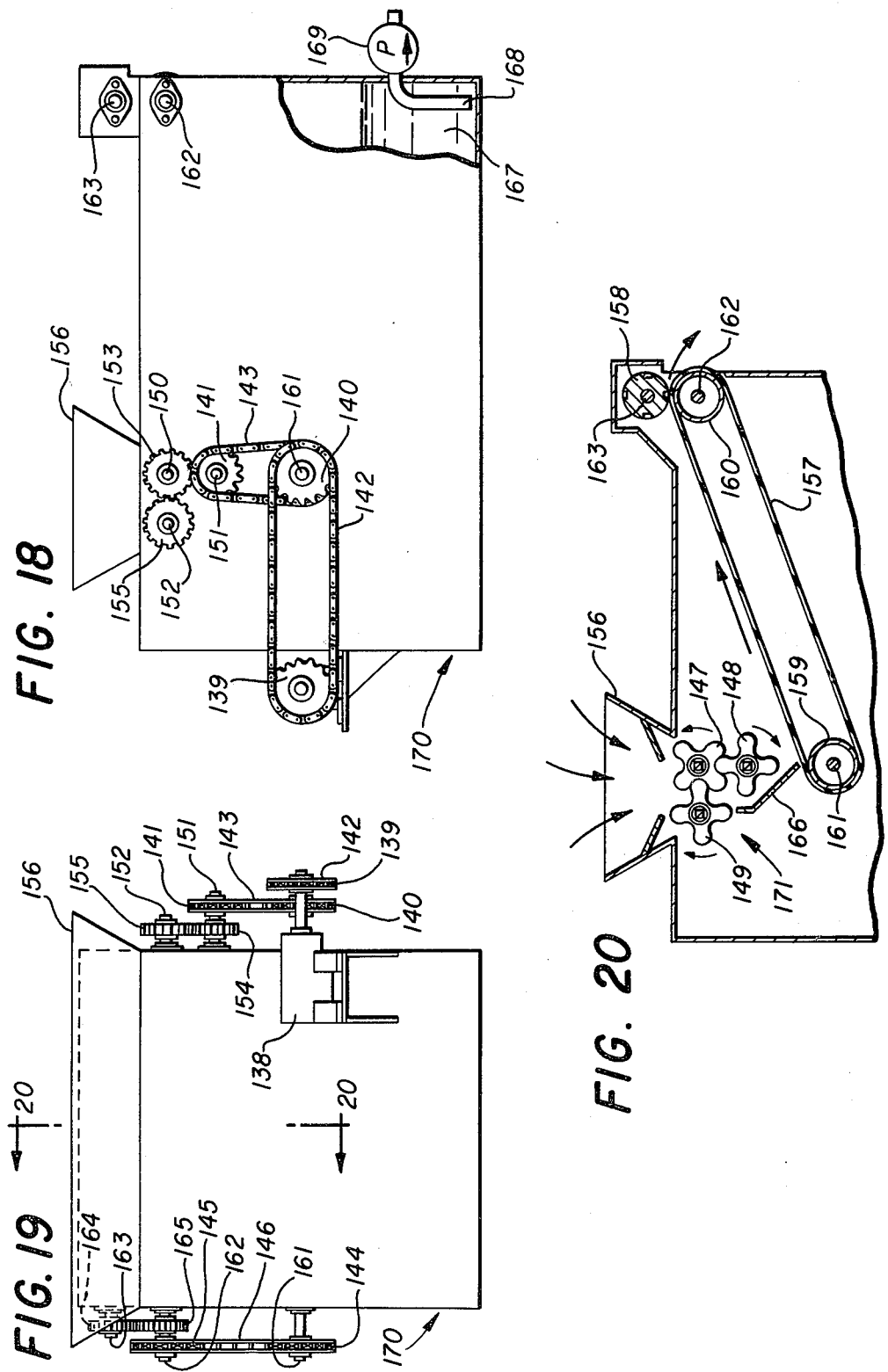

MATERIAL PROCESSING MACHINERY

This is a continuation of my co-pending application, Ser. No. 190,481 filed Sept. 24, 1980, now abandoned.

This invention relates to material processing machinery and methods and, more particularly, to plant material cell fracturing machines using intermeshing multilobed rollers and especially useful for the structural alteration processing of crops, or other plants. The machinery is useable on mobile or stationary mounts, either "in-field" or at other locations, and during or subsequent to harvest.

Many farm crops require mechanical processing during or soon after harvest. Other crops are mechanically processed at various non-critical lengths of time after harvest. By mechanical processing as used herein is meant some physical operation on the plant, such as crimping, wilting, chopping, grinding, crushing and/or juice extraction. Some operations such as these are best carried out in the field immediately after the crop is mowed or harvesting otherwise initiated. However, present forms of machinery for these purposes are often not adapted for in-field use, or they require, because of their size, a power and/or motive system that severely restricts their general portability, their transportability, or their ability to function under any but the best of field conditions. Further, such presently available machines often are designed to carry out only one process step, such as chopping, or crimping, or crushing, (maceration), or juice extraction (fractionation). Often the process involve batch processing as opposed to continuous processing by the treatment systems. In addition the energy consumed in carrying out many processes has made such processes uneconomic.

It is a principal object of the present invention to provide a machine for the continuous physical processing of material such as plant matter by the use of intermeshing multilobed rollers.

Another object is to provide in a single machine the capability of multiple process use such that by minor adjustment of the machine process material may have only stems and stalks ruptured or the whole of the feed material may be ground, macerated or fractionated.

Still another object is to provide a relatively lightweight easily transportable low energy demand machine for the continuous processing of plant matter at any desired location, such as in fields during or as part of harvest.

A further object is to provide a versatile machine capable of carrying out physical processing with a large number of different material types.

A still further object is to provide new processes for the physical treatment of plant matter made possible by machine mobility, versatility and low energy consumption.

Features of the invention useful in accomplishing the above objects include a set of multilobed rollers arranged to intermesh in a turning action in such a manner that material fed between the rollers is subjected to compressive and shearing forces, resulting in a controllable degree of particle fracture or cell rupture in the material being processed. The spacing of the rollers may be adjusted such that only the bulkier parts of the feed material, such as stalks and stems, are ruptured or even only slightly crushed. A different spacing adjustment may result in cell fracturing of the feed material, or, if the feed material is plant material, fractionation and an expression of a high percentage of its fluid content. Further, the number of lobes used on the intermeshing rollers will influence the character of the mechanical processing carried out. Because in some machines the turning drive torque for the rollers can be transmitted through the intermeshing lobes the drive mechanism for these machines can be far less complicated, less expensive and more efficient than in machines requiring long and complicated gear trains. For many operations the processors of the present invention can be mounted for field use with other machines on the same self-propelled or towed mobile platform, or on different mobile platform.

Specific embodiments representing what are currently considered the best modes of implementing the present invention are shown in the accompanying drawings.

Figure 2:
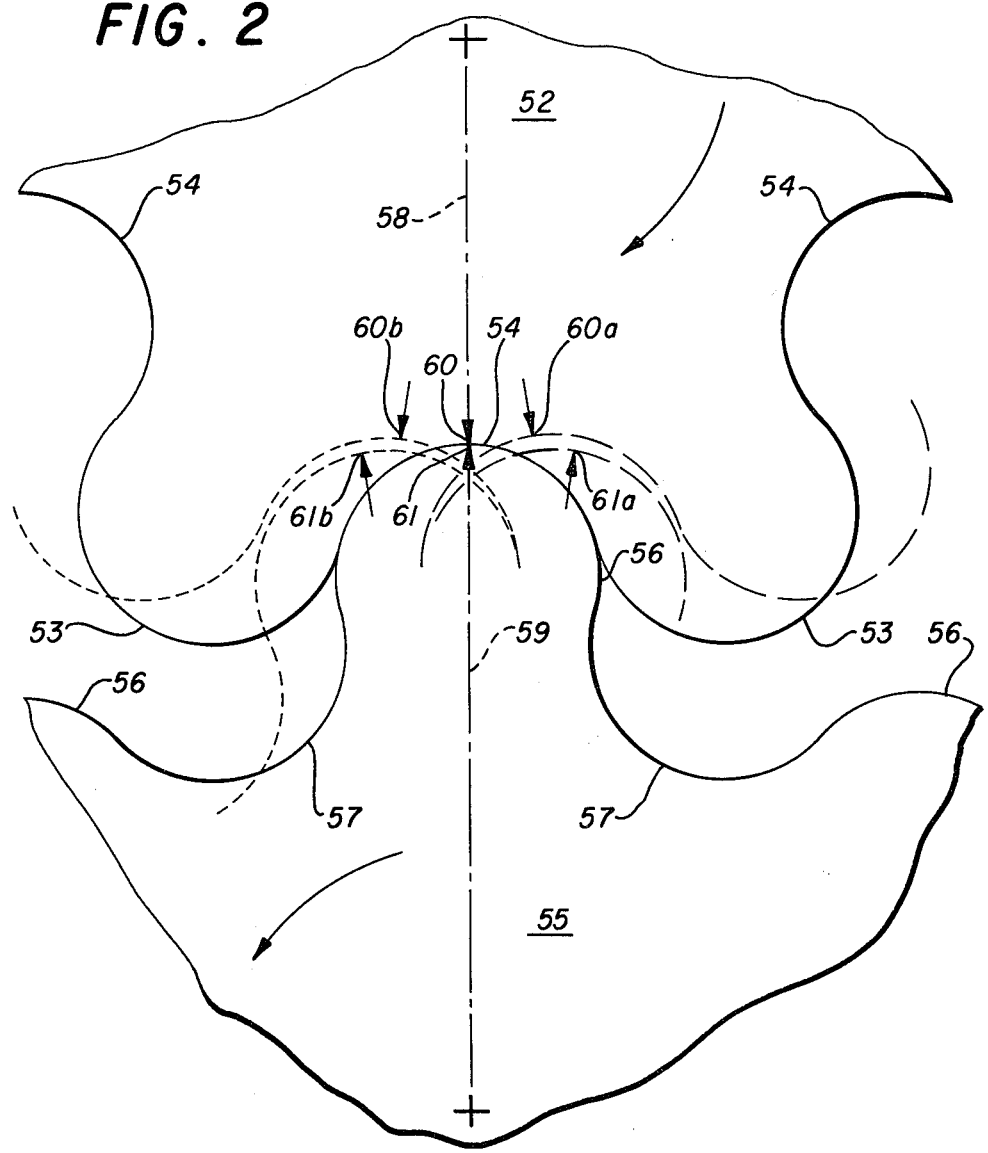
Figure 3A:
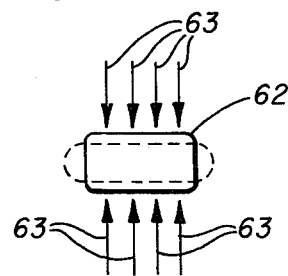
Figure 3B:
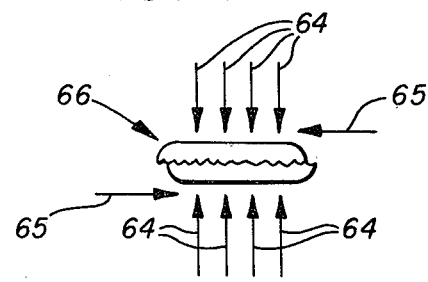

In the drawings:

FIG. 1 is a perspective partially broken away view of a basic set of intermeshing multilobe rollers constituting one form of the basic physical plant material processor according to the present invention;

FIG. 2, detail of intermeshing lobes of a processor;

FIGS. 3a and 3b, diagrams showing compressive and shear forces tending to rupture a plant cell;

FIGS. 4–8, end view diagrams illustrating diagrammatically other lobed roller combinations useful in the physical process of the present invention;

FIG. 9, a top plan view illustration of a different type of intermeshing lobed roller structure for the physical processing of plant material using some of the same principles as other processors shown.

Figure 11:
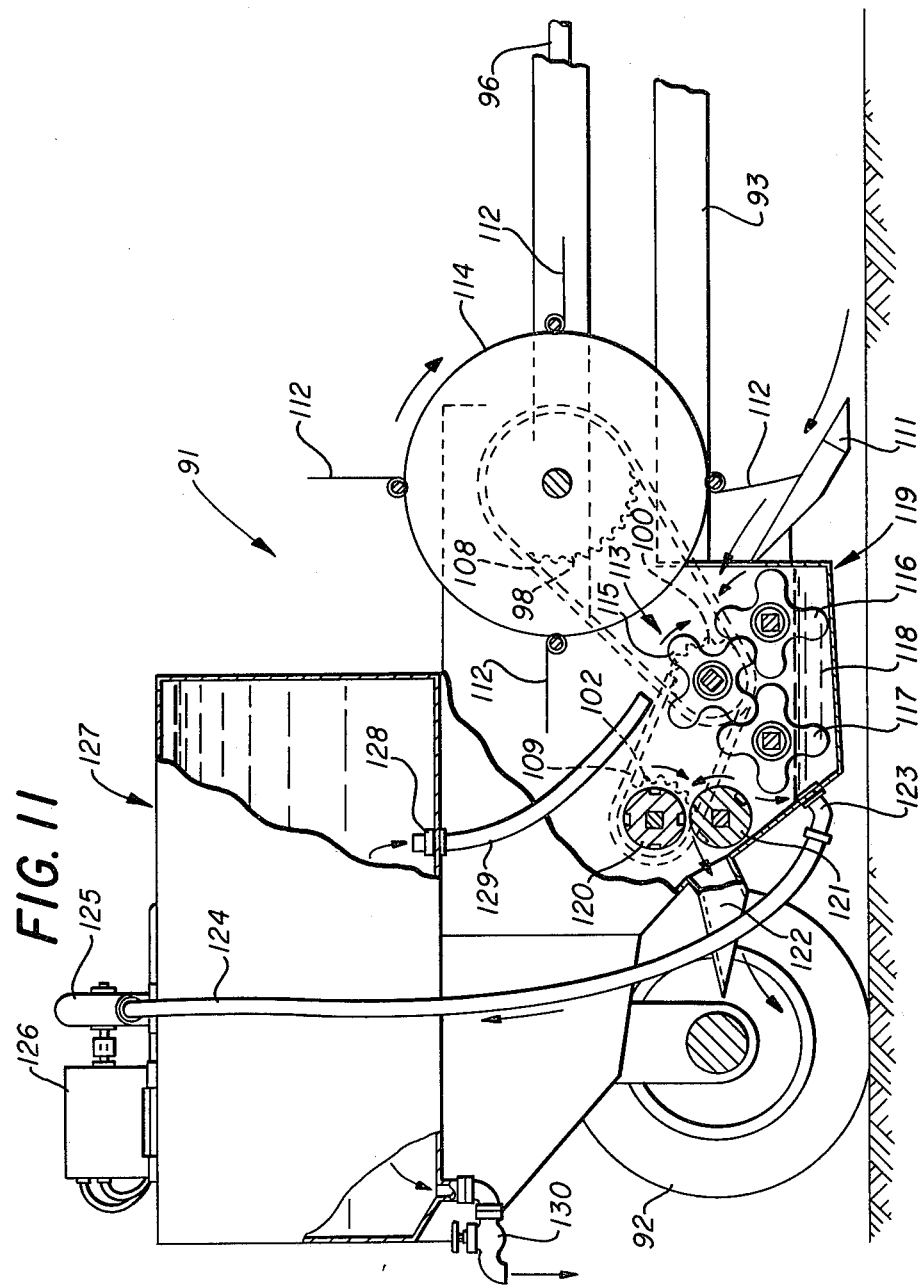

FIG. 10, a side elevation of a field usable farm implement machine of a well known type modified to incorporate a processor of the present invention and carry out new processing in place of what would have previously been uneconomic processing of forage crops;

FIG. 11, a partially cut-a-way side elevation view of the modified implement of FIG. 10 incorporating one embodiment of a lobed roller processor;

FIG. 12, a top plan view, partially cut away, of a portion of the implement of FIG. 10 incorporating a processor of the type shown in FIG. 1;

FIG. 13, a top view showing more detail of the processor incorporated in the implement of FIG. 10;

FIG. 14, a view in section taken along lines 14—14 of FIG. 12;

FIG. 15, a view in section taken along lines 15—15 of FIG. 12;

FIG. 16, a partial view in section of an implement of the type shown in FIG. 10 incorporating a second embodiment of a lobed roller processor;

FIG. 17, a partial top view illustrating in more detail the processor of FIG. 16;

FIG. 18, a side elevation, partially cut away, of a stationary or transportable forage crop processing system incorporating thie processor of the present invention;

FIG. 19, an end elevation of the processing system of FIG. 18; and

FIG. 20, a view in section of the processing system taken along lines 20—20 of FIG. 19.

Referring to the drawings:

As shown in FIG. 1, one embodiment of the processor 30 of the present invention may have a primary roller 31 and one or more secondary rollers 34, 35. The primary roller 31 of processor 30 has lobes 32 and grooves 33 extending from its mean radius and running along its axial length. The lobes and grooves are in the form of circular arc sectors. Secondary rollers 34 and 35 have lobes 36 and 37 and grooves 38 and 39, respectively, likewise extending from their mean radii and running along their axial lengths. The lobes and grooves of the secondary rollers match the lobes and grooves of the principal roller in size and shape so that they will intermesh when the rollers are mounted appropriately relative to each other. More particularly the lobes of the intermeshing rollers are essentially reverse images of the grooves and of the same size, i.e., the lobes extend outwardly from the mean radius of the roller by the same distance the grooves extend inwardly from the mean radius of the roller. It has been found most advantageous if this distance is at least 1/50 of the mean radius of the roller.

In the processor 30 shown in FIG. 1 the rollers 31, 34 and 35, each comprise a number of plates 40 of a suitable material, such as steel, formed in the appropriate lobed configuration, as depicted. The plates 40 of primary roller 31 are mounted on square shaft 41 in abutting fashion to form a roller of the desired length. Likewise, secondary rollers 34 and 35 comprise similar plates 42 and 43, respectively, also mounted on square shafts 44 and 45, respectively. Any or all of the rollers of the processor could effectively be made of a single piece of suitable material appropriately machined or with other materials and processes. Further, the plates 40, 42 and 43 of the rollers do not necessarily have to be oriented uniformly along the shafts 41, 44 and 45. For example, each of the plates 40 could be rotationally offset by 90° from the two plates abutting it and each of the plates 42 and 43 rotationally offset 180° from its neighbors. With such an arrangement each of the lobes and grooves of the primary roller 31 would still intermesh with corresponding and lobes of the secondary rollers 34 and 35 but with the difference that each lobe would work into a "walled pocket" to produce a somewhat different characteristic of material processing. Of course, the square shape of the shafts 41, 44 and 45 is merely illustrative and the shaft could as well be splined or keyed or the roller plates could be affixed thereto by other means.

The rollers 31, 34 and 35 are "cut away" in FIG. 1 to show the shafts 41, 44 and 45 rotatably mounted near their ends in bearing members 46, 47 and 48, respectively. Similar bearing members also mount the shafts at their other ends. The bearing members are mounted to the frame 49 of the processor.

It is desirable to have the rollers of the processor mounted in such a way that the minimum clearance between the primary roller lobes and grooves and grooves and lobes of the secondary rollers and can be changed or adjusted reasonably easily and quickly. The illustrated structure of bearing member 46 shows somewhat schematically such an adjustment through substitution of various insert bearing elements 50 having different thicknesses. Hence the shaft bearing 51, and thus the primary roller, is variously positioned vertically with respect to the other bearings 52 and 53 of the secondary rollers 34 and 35. Further, it is often desirable that the rollers be held in their position of desired clearance by spring or other yieldable pressure in order to provide relief if some unyielding material or object should accidentally be fed to the processor. Spring 28 and bearing pressure block 29 schematically depict such a system. In the operation of the processor of FIG. 1 the rollers 31, 34 and 35 are driven in synchronous rotation, for example, with primary roller 31 driven in a counter-clockwise direction and secondary rollers 34 and 35 driven in a clockwise direction. Material to be treated is fed between rollers 31 and 34 and emerges between rollers 31 and 35. Material entering the processor is subjected not only to compressive forces as in ordinary roller crushes but to shear forces as well, due to the relative motion between the opposing lobe surfaces and groove surfaces. Such shear forces are not produced in other roller crushers where the opposing roller surfaces are moving at the same speed. The sliding action between a lobe of one roller and the groove of an opposing roller whereby shear stresses are produced on material therebetween is illustrated by the diagram of FIG. 2.

In FIG. 2 there is shown an enlarged view of the intermeshing portions (only) of a primary roller 52 having lobes 53 and groove 54 and a secondary roller 55, which, for purposes of this illustration, is of the same size as the primary roller and has the same number of lobes 56 and grooves 57. The direction of rotation of the rollers is as shown by arrows. The two rollers are shown at the point where the radial centerline 58 of a groove 54 and the radial centerline 59 of a lobe 56 coincide, and thus centerline point 60 on the surface of groove 54 is directly opposite centerline point 61 on the surface of lobe 56. It is at this position that maximum compression of material between the rollers occurs. The dashed lines show the relative positions of the two rollers 52 and 55 about 15° earlier in their rotation. It is to be noted that in this position the centerline point 60a on the surface of groove 54 is *not* directly opposite the centerline point 61a of lobe 56. Shown by the dotted lines is the position of the rollers when they have moved about 15° past "dead center" position. At this time centerline point 61b has moved past and is on the other side of centerline point 60b. Thus, it can be seen that material between a lobe such as 56 and groove such as 54 is subjected not only to compressive stress but also more importantly to shear stresses as the surfaces of the lobe and grooves move in the "sliding" manner illustrated.

The shear stresses produced by the processor of this invention are especially important when it is desirable to fracture a large percentage of the cells of plant material being processed. Prior art processors depending primarily on squeezing or compressive stress do not fracture nearly as large a percentage of cells because of the elastic nature of the cells. As illustrated in FIG. 3a, an elastic cell 62 when subjected to compressive stress (only), as represented by arrows 63, will tend to merely flatten and bulge at its sides unless the stress forces are direct and effectively strong. For example, hammer mills depend on large forces directed repeatedly at small areas of the material being processed to achieve fracture of a reasonably high percentage of cells. Such a process is relatively time consuming and high in power consumption. When compressive forces represented by arrows 64 in FIG. 3b are combined with shear forces represented by arrows 65 the cell 66 fractures more easily.

It is in this way that the circular arc sector lobes of the rollers of this invention differ drastically from gears. Whereas gears are designed to have as little surface slippage or sliding contact as possible between drive gear teeth and driven gear teeth, such sliding motion is desirable in the rollers here disclosed even when a primary roller is used to drive one or more secondary rollers, as will be explained subsequently. Material fed between gear type rollers may be subjected to severe compressive forces but not to shear forces of the type produced by the present invention.

Figure 4:
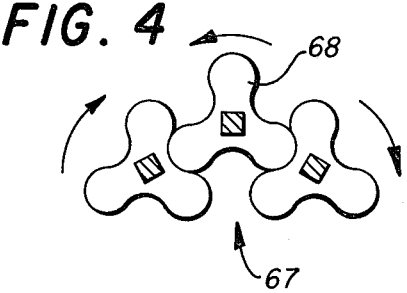
Figure 5:
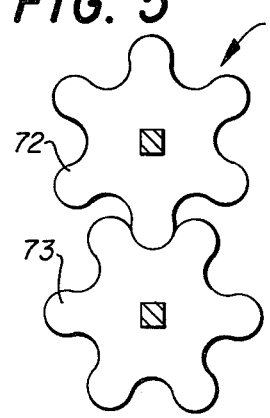
Figure 6:
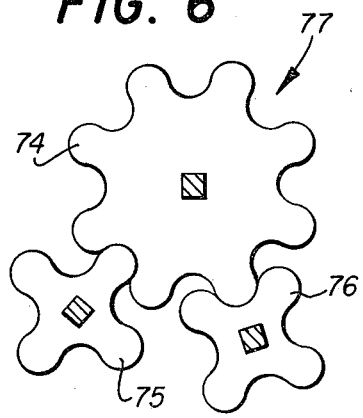
Figure 8:
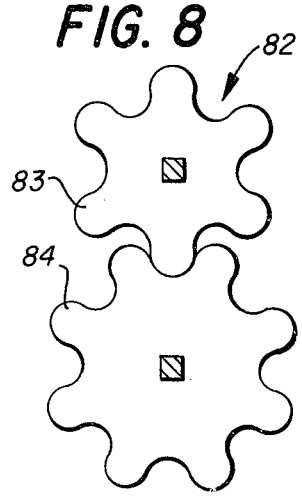

The processor of the present invention is not restricted to primary rollers that are larger and have a greater number of lobes than the secondary rollers. FIG. 4 illustrates a processor 67 wherein the primary roller 68 and secondary rollers 69 and 70 each are 3-lobe rollers. The processor 71 in FIG. 5 comprises a primary roller 72 having six lobes and a secondary roller 73 of the same size having an equal number of rollers. An eight-lobed primary roller 74 and two four-lobed secondary rollers 75 and 76 are shown in the processor 77 of FIG. 6. Processor 78 of FIG. 7 has two three-lobed secondary rollers 79 and 80 working against an eight-lobed primary roller 81. In the processor 82 of FIG. 8 the primary roller 83 is smaller and has fewer lobes (six) than the secondary roller 84 with eight lobes.

Whereas the lobes and grooves of the rollers of the processors disclosed thus far are in the form of radial irregularities of the rollers, the processor of the present invention may also comprise rollers wherein the lobes and grooves are in the form of axial irregularities of the rollers. The rollers of such a processor are shown in FIG. 9, wherein a primary roller 85 has lobes 86 and grooves 87 which intermesh with lobes 88 and grooves 89 of secondary roller 90. As in the processor of FIG. 1, the lobes of the rollers in the processor of FIG. 9 are essentially a reverse image of the grooves of the other rollers and the lobes and grooves of the rollers each extend the same (but opposite) distances from the mean radius of the roller. Also as in the processor of FIG. 1, the rollers of the processor of FIG. 9 may be made up of a plurality of identically shaped plates. These plates are juxtapositioned on the shaft front to front and back to back.

It can easily be seen from FIG. 9 that when rollers 85 and 90 are rotatably driven in the directions indicated by the arrows and at the same rate of rotation, material fed between the rollers will be subjected to shear forces as well as compressive forces. The shear forces are produced by relative movement of the opposing surfaces of the two rollers due to their differing distances from their center of rotation when their rotational rate is the same. Thus, for many, but not all, purposes of the present invention lobed and grooved rollers of the type shown in FIG. 9, which may be referred to as disked rollers, are equivalent to lobed and grooved rollers of the type shown in FIGS. 1, 2 and 4 through 8.

The processors of the present invention are extremely versatile machines. They are especially suited to the processing of plant materials and particularly farm crops and products. For example, in harvesting many forage crops it is a usual practice, after mowing, to leave the crop on the ground for a period of drying before baling or other procedures. Drying time is often lessened by limited maceration of the new mown hay, such as by crimping or crushing procedures. The maceration should be limited in order that nutrients in the plant juices will not be lost by the juices dropping off the plant material and on the ground.

Through adjustment of the present processor for proper clearance between primary and secondary rollers the stalks and stems of plant material being processed can be fractured rather thoroughly, or at least to an appropriate degree, without undue crushing of leaf matter, which at this stage is undesirable. Thus the stems can be ruptured through most of their length and the cells therein fractured to the desired extent such that the juices produced remain for the most part on the plant material but are exposed for quick and easy evaporation of water content while leaving the soluble nutrients with the plant matter. Up to 30%-40% of the plant moisture may be released and evaporated in this manner.

In other plant treatment processes it may be desirable to extract and process separately a certain proportion or even the largest possible amount of the plant juices. Proper adjustment of clearance between rollers of the present invention can produce thorough maceration of the plants, including leaves as well as stems and stalks, with fracturing of up to 75%, or even 90% or more of the plant cells, thus freeing for recovery substantially all of the plant juices and soluble nutrients therein.

While some prior art processors are capable sometimes of even a high percentage of cell fracture, such processors are usually the "batch" rather than continuous processing type and are large in comparison to the present processors and thus of only limited, if any, mobility. Further, such prior art processors often require much greater amounts of power and considerably more time if they are to achieve plant cell rupturing results even nearly comparable to those of the present processors.

The processors of this invention, which are adapted to processing of farm products may be relatively small, for example, from four to eight feet wide with the rollers having a radius at the lobes of perhaps between 9 and 12 inches. Such a processor is light and small enough to be mounted as a farm implement for mobile use as depicted in FIGS. 10 through 16.

As shown in FIGS. 10-15, the farm implement processor 91 is mounted on wheels 92 and adapted to be pulled through connection of the tongue or towbar 93 to hitch 94 of tractor 95. Power is supplied from the tractor power takeoff through U-jointed drive shaft 96, gear box 97, and the various gears and chains 95 through 110. Of course, such processors may as well be mounted on a self-propelled combine.

In operation, as the implement 91 is moved through the field, the plant stalks are severed by cutters 111 and swept into the processor by the spring tines or fingers 112 of rotating rake 114. The severed plants are fed between four-lobed primary roller 115 and the four-lobed secondary rollers 116 and 117 as they are driven by their intermeshing relationships with primary roller 115. In this instance the roller clearance is adjusted for a very high proportion of cell fracturing to release major amounts of plant juices which collect in pool 118 at the bottom of the processor tank 119. The plant fiber residue passes between squeeze rollers 120 and 121, driven by gears 102, 103, 105 and 106, where juices remaining on the fibers are squeezed out into the tank 119. The residue plant fibers are then dumped through exhaust chute 122.

In many processors of this type it has been advantageous to so position the processor that the rollers 116 and 117 are continually wetted by the juices in pool 118. To keep the pool 118 at the desired level the juices may be periodically or continually removed through drain 123 and hose 124 by pump 125 powered by motor 126 to storage tank 127. In the event it is desirable to wet roller 115, controlled drain 128 may be opened to allow juices from the storage tank 127 to flow through conduit 129 onto that roller. Drain 130 may be used to empty storage tank 127 to a larger storage tank or tank truck.

FIG. 16 illustrates, in a sectional view of the processor area of the implement 91, some slight modifications that are advantageous when using disked (axially lobed) rollers of the type shown in FIG. 9 rather than the circumferentially lobed rollers shown in FIG. 11. A guide shelf extension 131 of cutter 111 will insure that all of the cut plant material is carried to processor rollers 132, 133 and 134 and that none is allowed to fall directly into the processor tank 119. A stripper 135 is helpful in removing material from roller 134 and feeding it to squeeze rollers 120 and 121. As shown in the cutaway detail view of FIG. 16, guide extension 131 and stripper 135 may be equipped with fingers 136 and 137, respectively, which extend into the grooves of the rollers 133 and 135, respectively.

In the processor, as shown in FIGS. 11, 12 and 13, only primary roller 115 receives direct drive through sprocket 99, with secondary rollers 116 and 117 being driven by the lobes and grooves of primary roller 115. However, it may be desirable in some instances to provide synchronous gear drive to each of the rollers; indeed direct drive to the shaft of each roller of the processor is necessary when the lobes of the processor are fewer than four or are of the axial type shown in FIG. 9.

Turning now to FIGS. 18 through 20, there is shown a stationary installation 170 of a processor according to the present invention; FIG. 19 being an end view, FIG. 18 a side view partially cut away and FIG. 20 a view in section taken along lines 20—20 of FIG. 19. In this embodiment the processor 171 is powered by an electric motor 138, for example, through sprockets 139, 140 and 141, and chains 142 and 143.

The processor 171 itself comprises 3 four-lobed rollers 147, 148 and 149 mounted on shafts 150, 151 and 152, respectively. The processor rollers are driven synchronously through gears 153, 154 and 155 keyed to their respective shafts 150, 151 and 152 from sprocket 141 keyed to shaft 151. The rollers 147, 148 and 149 are adjusted for minimum lobe-in-groove clearance for maximum cell fracture and juice extraction.

Plant material to be processed is fed into hopper 156 and thereby funneled between rollers 147 and 149. Macerated material from the processor falls on perforated conveyor 157 so the juices are further drained from ruptured fiber material cells prior to arrival at squeeze roller 158 where the remaining juices are squeezed out to the extent possible before the fibrous residue is expelled. Conveyor 157 is carried and driven by rollers 159 and 160 mounted on shafts 161 and 162, respectively. Roller 160 is driven by sprocket 144, keyed to shaft 161, through chain 146 to sprocket 145 keyed to shaft 162. Squeeze roller 158, keyed to shaft 163, is driven from gear 164, also keyed to shaft 163, and gear 165 keyed to shaft 102.

Extracted plant juices coming directly from the processor 171 fall on screen 166 where fibrous material is removed before the juice is added to the extract pool 167. As the fibers begin to build up on screen 166 they are washed onto the conveyor 157 by additional juice from the processor 171. Juice may be removed from pool 167 through drain 168 by pump 169 for further processing.

In the design of a processor of the type disclosed hereby the various design choices such as the nominal or mean diameter of the rollers, the length of the rollers, the types of lobes (whether disked or circumferential), whether the rollers are to be machined from solid stock or comprise a plurality of abutting plates, the number of rollers and their relative sizes and number of lobes, should be determined by the primary purpose of the processor even though provision is made for the changes and/or adjustment to other purposes. As a general rule the fewer the number of radial lobes the greater the compressive and shear forces produced; also, the greater the rotational speed of the rollers the greater the power or fuel consumption above an efficient speed range.

In the processing of forage crops the plant materials are subjected to treatments whose purpose is to enhance the nutritional value of the end product or products, or to preserve for later use products without undue loss of nutritional value. The various types of plants contain in varying proportions soluble and insoluble vitamins, minerals, proteins, xanthrophyll, cellulose fibers and large amounts of water. Some plants are cultivated principally for their high sugar or starch content. Most present plant processing is directed to the concentration and/or separation and recovery of useful factions and their preservation for later use. Processing ranges from complicated and expensive combinations of mechanical and chemical treatment to simple chopping and dehydration or silage, or merely drying and haying.

The processor of the present invention makes possible new relatively inexpensive crop processing techniques materially enhancing the usefulness and value of crops. By way of example, alfalfa, a plant rich in protein, is often processed by dehydration. The alfalfa, after mowing, is crimped and windrowed in the field for a period of initial drying. This drying can reduce moisture content to about 60% by weight from about 80% by weight when cut. Thereafter the alfalfa is transported to a dehydration plant where it is chopped and essentially all of the remaining moisture removed in a fuel fired dehydrator. The two major expenses of this process are fuel costs and labor costs. The recent dramatic rise in fuel costs has pushed dehydration processing into the area of questionable economic feasibility. Unfavorable weather such as high humidity can greatly extend the initial field drying period required and thus increase labor costs. Using the processor of the present invention dehydration of an alfalfa crop can be carried out at a much lower cost.

A farm implement processor similar to that of FIGS. 10 through 15 is used with the roller clearance between primary and secondary rollers adjusted such that the stalks and stems of the plants are fractured throughout their length but the leaves are left essentially unaffected. This fracturing of the plant stems and stalks releases some juices of these parts but their amount is such that very nearly all of this juice remains on or with the plant fibers, stems and leaves and little, if any, falls into the juice reservoir 119. The damp plant fibers, stems and leaves are expelled through exhaust chute 122, the rollers 120 and 121 being set far enough apart that no squeezing takes place but the plant material is merely transported to the chute 122.

Evaporation of the water from the plant juices is rapid and in approximately thirty minutes to one hour, under ordinary conditions, moisture content of the plant material is reduced from about 80% by weight when cut to about 40% or less by weight. Water primarily evaporates from the plant juices generally leaving soluble nutrients still adhering to the plant material in either a crystalline or a thick syrup form.

After this short drying period the plant material is recovered and transported to the dehydration plant. The dehydration plant is ordinarily at a nearby location, centralized for that farm if it is large, or perhaps for several smaller farms. At the dehydration plant site the plant material is further prepared for dehydration in a processor similar to processor 170 shown in FIGS. 18 through 20. The processor rollers preferably are of the multiple plate type with adjacent plates rotationally ffset, as previously described. The secondary rollers are set for minimum clearance to theprimary roller to produce the maximum cell fracture in all plant material. This positive fracturing action macerates the leaf material as well as the stems and stalks. Since the stems and stalks have already been dried to a great degree they are abrasive and thus help in further rupturing the leaf and other plant cells in this macerating operation. Because of the amount of dehydration previously accomplished in the field the juices liberated in this further processing adhere to and remain with the plant material rather than dripping into the reservoir of the processor. The damp, macerated plant material is then conveyed to the dehydration chamber on conveyor belt 157 of processor 170, for example. Roller 158 is not present in this machine since no squeezing or juice separation is desirable.

The damp plant material is then more fully dehydrated, leaving small particle mater containing nutrients, vitamins and minerals originally present in the plant at harvest. The material has an extremely high nutritional content since more than 95% of these nutrients are contained in material which weights only 20% as much as the original plant.

Because of the thorough fracturing of the stalk and stem fibers and the efficiency is field evaporation of water from the plant juices, it has been found that there is considerable fuel saving over prior art processes in the recovery and transportation of the plant material to the dehydration plant site simply because of its lighter weight. Further, it has been found that because more water has been removed from the plant material prior to its introduction to the dehydrator and because of the greater amount of cell rupture than in prior dehydration processes, the dehydrator can be operated quite efficiently at a temperature of only 150° to 200° F. as compared to the 500° F. temperature normal in prior art processes. And even at these reduced temperatures the time required to complete the dehydration is less. Thus, fuel savings in operation of the dehydration plant are very significant.

At times it may be desirable to recover separately some of the soluble nutrients, vitamins and minerals from the plant material. Such recovery is easily accomplished by the well known method of "shaker screening" the plant material before the macerating step at the dehydrator plant. This shaker screening removes from the plant material the soluble nutrients which have precipitated or crystalized on the plant material during the field drying step. After shakeer screening the plant material may then be processed as outlined previously.

The dehydrated end product of the processes disclosed above is superior to the more expensively obtained similar products of the prior art processes since a higher percentage of the original plant nutrients are retained in the end product. Over and above this superiority is the fact that ruminant animals are able to convert the cellulose structure fiber material of the product produced by the present invention to protein with an efficiency more than twice as great as previous products. This is because of the thorough fracturing of the cellulose cells produced by the processor.

It has been found that the processor of the present invention may be used with particular effectiveness in processing high starch plants, such as wheat, milo and other grains. The full stalk and leaves of such plants are approximately 50% to 60% starch, while the grain is approximately 80% starch. However, the grain head is only about one-half the weight of the stem and leaves. Thus, about 42% of the plant's starch is in the grain head while about 58% of the plant starch is in stem and leaf structure. The thorough cell rupture accomplished by the processor of the present invention makes that starch available. Thus a mixture of high protein forage plants and high starch plants both processed as outlined above produces an extremely valuable animal feed concentrate.

Processing of the entire plant of high starch plants according to the present invention provides a much more efficient alcohol production process and thus a cheaper source of fuel than when only the grain is processed. Because the thorough cell fracturing makes more of the total plant starch more easily available for conversion to sugar, and subsequently to alcohol, the production of alcohol is far less expensive. When processed according to the present invention high starch plants produce a material having a much greater amount of starch available than from the grain alone; in addition the material has a denser packing characteristic than grain, thus allowing more efficient shipping.

Whereas this invention is herein illustrated and described with respect to several embodiments thereof, it should be realized that various changes may be made without departing from the essential contributions to the art made by the teachings hereof.

I claim:

1. A method of processing plant material comprising: harvesting at least the top one-third of growing plants; inputting the harvested plant material to a first processor comprising a plurality of roller members each with a plurality of lobes and grooves intermeshing with the lobes and grooves of at least one other roller member; said rollers being so positioned as to fracture the stalks and stems of said plant material along the greater part of their length while leaving the leaf cells of said plant material substantially unfractured; substantially dehydrating said plant material; thereafter inputting said so processed plant material to a second processor of the same general type as said first processor but with said rollers being so positioned as to produce maximum cell fracturing action; and subsequently more fully dehydrating the processed plant material output from said second processor.

2. The method of claim 1, wherein said plant material is shaker screen processed prior to inputting it to said second processor.

3. The method of either claim 1 or 2, wherein said dehydration is carried out at a temperature below 500° F.

4. The method of claim 3, wherein said temperature is between 150° and 200° F.

5. The method of claim 1 wherein said substantially dehydrated plant material is dehydrated by allowing said plant material to dry in the open air for up to one and one-half hours.

* * * * *